(12) United States Patent
Levy

(10) Patent No.: US 12,537,768 B1
(45) Date of Patent: Jan. 27, 2026

(54) ENHANCED PARALLELISM IN DOCSIS FILTER GROUP PROCESSING

(71) Applicant: Harmonic, Inc., San Jose, CA (US)

(72) Inventor: Adam Levy, Pardes Hana-Karkur (IL)

(73) Assignee: Harmonic, Inc., San Jose, CA (US)

( * ) Notice: Subject to any disclaimer, the term of this patent is extended or adjusted under 35 U.S.C. 154(b) by 529 days.

(21) Appl. No.: 17/979,606

(22) Filed: Nov. 2, 2022

Related U.S. Application Data

(60) Provisional application No. 63/275,621, filed on Nov. 4, 2021.

(51) Int. Cl.
*H04L 45/745* (2022.01)
*H04L 12/28* (2006.01)

(52) U.S. Cl.
CPC ........ *H04L 45/745* (2013.01); *H04L 12/2801* (2013.01)

(58) Field of Classification Search
CPC .......................... H04L 45/745; H04L 12/2801
USPC ......................................................... 370/392
See application file for complete search history.

(56) References Cited

U.S. PATENT DOCUMENTS

| | | | | |
|---|---|---|---|---|
| 7,031,301 B1 * | 4/2006 | Oz | ........................ | H04L 65/752 348/E7.071 |
| 7,161,945 B1 * | 1/2007 | Cummings | ............. | H04L 47/21 725/94 |
| 8,595,367 B1 * | 11/2013 | Beser | ................. | H04N 7/17309 709/224 |
| 9,313,131 B2 * | 4/2016 | Hammond | .............. | H04L 45/16 |
| 9,699,102 B2 * | 7/2017 | Cloonan | ............. | H04L 12/2801 |
| 10,069,797 B2 * | 9/2018 | Pan | ...................... | H04L 63/0254 |
| 10,817,269 B2 * | 10/2020 | Martini | ..................... | G06F 8/61 |
| 10,827,210 B1 * | 11/2020 | Almeida | ........... | H04N 21/6118 |
| 10,880,001 B2 * | 12/2020 | Finkelstein | ........... | H04L 1/1812 |
| 10,944,684 B2 * | 3/2021 | White | ................... | H04L 47/626 |
| 11,201,839 B2 * | 12/2021 | Hoole | ................... | H04L 47/2441 |
| 11,277,390 B2 * | 3/2022 | Verzun | .................... | G06F 21/64 |
| 11,316,688 B2 * | 4/2022 | Ansari | ................. | H04M 15/44 |
| 11,410,112 B2 * | 8/2022 | Hou | ................. | G05B 19/41875 |

(Continued)

FOREIGN PATENT DOCUMENTS

| | | | | | |
|---|---|---|---|---|---|
| CN | 117642097 | A | * | 3/2024 | ............. A42B 3/064 |
| EP | 1210793 | B1 | * | 8/2005 | ............. H04L 47/10 |

(Continued)

*Primary Examiner* — Melvin H Pollack
(74) *Attorney, Agent, or Firm* — Brokaw Patent Law, PC; Christopher J. Brokaw

(57) ABSTRACT

Enhanced parallelism in DOCSIS filter group and Service Flow processing. A plurality of packets that have been transmitted across a computer network are received. A responsive action to be performed against each of the plurality of packets is determined by performing DOCSIS filter group processing on the plurality of packets using a single unified Filter Group table. The single unified Filter Group table comprises a plurality of rules that each define a set of criteria and a particular responsive action to perform against any packet matching the set of criteria for that rule. The plurality of rules in the single unified Filter Group table identify, in their sets of criteria, different Filter Group identifiers (IDs). Thereafter, the responsive action is performed on each of the plurality of packets. A single unified classifier table may also be used to assign a Service Flow to packets with enhanced parallelism.

21 Claims, 5 Drawing Sheets

(56) References Cited

U.S. PATENT DOCUMENTS

| | | | |
|---|---|---|---|
| 11,411,922 B2 * | 8/2022 | Shribman | G06F 16/955 |
| 11,431,561 B2 * | 8/2022 | Smith | H04L 61/4505 |
| 11,653,354 B2 * | 5/2023 | Cirik | H04B 7/088 |
| | | | 370/329 |
| 11,783,925 B2 * | 10/2023 | Ansari | H04L 9/0891 |
| | | | 726/7 |
| 11,997,363 B2 * | 5/2024 | Cook | H04N 21/6338 |
| 2004/0098511 A1 * | 5/2004 | Lin | H04L 69/329 |
| | | | 709/249 |
| 2005/0265397 A1 * | 12/2005 | Chapman | H04L 12/2801 |
| | | | 370/352 |
| 2012/0039173 A1 * | 2/2012 | Danzig | H04L 47/30 |
| | | | 370/235 |
| 2016/0308766 A1 * | 10/2016 | Register | H04L 45/745 |
| 2017/0244642 A1 * | 8/2017 | Katebi | H04L 45/54 |
| 2023/0006933 A1 * | 1/2023 | Gaydos | H04W 72/0446 |
| 2024/0313996 A1 * | 9/2024 | Virag | H04L 12/12 |

FOREIGN PATENT DOCUMENTS

| | | | | |
|---|---|---|---|---|
| WO | WO-2013135155 A1 * | 9/2013 | | H04L 12/4645 |
| WO | WO-2016162833 A1 * | 10/2016 | | H04L 45/38 |
| WO | WO-2016172066 A1 * | 10/2016 | | H04L 43/04 |

* cited by examiner

ENHANCED PARALLELISM IN DOCSIS FILTER GROUP PROCESSING

CLAIM OF PRIORITY

This application claims priority to U.S. Provisional Patent Application Ser. No. 63/275,621, filed Nov. 4, 2021, entitled "DOCSIS Filter Group Processing Optimizations," the contents of which are hereby incorporated by reference for all purposes as if fully set forth herein.

FIELD OF THE INVENTION

Embodiments of the invention generally relate to more efficiently processing packets received over a network, and more particularly, to enhanced parallelism in DOCSIS Filter Group Processing.

BACKGROUND

Data Over Cable Service Interface Specification (DOCSIS) is a widely employed telecommunication standard that facilitates high-bandwidth data transfer conducted over a cable television (CATV) infrastructure.

When an entity on a network receives a packet, the entity processes that packet to determine what responsive action should be performed. To that end, a network entity may use a DOCSIS subscriber management filter ("DOCSIS filter"), which is a type of access control list (ACL) that may define a rule for specifying whether a packet that satisfies certain criteria should be permitted or denied transmission to its destination. The information that is considered by a DOCSIS filter when determining whether to allow or deny a packet typically resides within the header of the packet. A DOCSIS filter may be used with both Downstream (DS) and Upstream (US) packet transmissions. A DS DOCSIS filter may be determined or specified based on the destination MAC address, while an US DOCSIS filter may be determined or specified based on the source MAC address.

DOCSIS filters are employed by a Cable Modem Termination System (CMTS). A group of DOCSIS filters may be organized as a DOCSIS filter group. Typically, a CMTS will employ multiple groups of DOCSIS filters that are each identified by a filter group identification number (Filter Group ID).

DOCSIS filters may be defined for a type of DOCSIS device type. For example, a first group of DOCSIS filters might be established for cable modems, a second group of DOCSIS filters may be established for a type of customer premise equipment (CPE), and a third group of DOCSIS filters may be established for a different type of customer premise equipment (CPE), and so on. DOCSIS filters may also be applied selectively using a cable modem configuration file so that the DOCSIS filter applies for that cable modem and all the CPEs that are behind that cable modem in the network. The rules defined by DOCSIS filters are global in terms of their applicability.

Typically, multiple DOCSIS filter groups are used. Each DOCSIS filter group specifies multiple rules, indices, and/or filters to apply. The configuration of a CMTS or a Cable Modem (CM) indicates when it should use or apply a particular DOCSIS filter group to a packet. A CMTS will apply all of the rules defined by a DOCSIS filter group having the appropriate Filter Group ID to a packet according to its configuration. A CM will apply all of the rules defined by a DOCSIS filter group having the appropriate Filter Group ID to itself and the CPEs serviced by that CM according to its configuration. For example, a CM configuration file of a particular CM may define, for each DOCSIS device type, which subscriber filter group should be used by that CM as well as the CPEs serviced by that CM.

Packets may be compared against a group of DOCSIS filters using hardware or software or both. In hardware, DOCSIS filters are usually implemented using a ternary content-addressable memory or TCAM, where each bit is either 0, 1, or "don't care"-a single electric "pulse" provides the first match result. In making a comparison in software, DOCSIS filters are usually implemented by a data structure, such as a tree data structure. A Data Plane Development Kit (DPDK) Access Control List (ACL) library provides capabilities to classify a batch of one or more input packets based on a set of classification rules.

Streaming SIMD Extensions (SSE), Advanced Vector Extensions (AVX), AVX2, and AVX-512 are examples of extensions to the x86 instruction set architecture which permit a certain number of packets in a batch to be processed in parallel by allowing the same operation to be performed on multiple memory addresses in the same clock cycle. The particular instruction used in processing a batch of packets is based on which instruction is more efficient, which in turn depends upon the batch size. As an example, if a batch size is between 4 and 7 packets inclusive, then an instruction or command from the Streaming SIMD Extensions 4 (SSE4) SIMD CPU instruction set might be used, and if the batch size is between 8 and 15 packets inclusive, then a different instruction or command from the Streaming SIMD Extensions 8 (SSE8) SIMD CPU instruction set might be used, and if the batch size is between 16 and 31 packets inclusive, then a different instruction or command from an instruction set might be used, and if the batch size is 32 or more packets, then a different instruction or command from an instruction set might be used.

Packets are processed by a CMTS implemented in hardware or software in batches. Packets will often have different destinations, e.g., a packet's destination may be a cable modem (CM) or a particular customer premises equipment (CPE) situated behind a CM in a network at the customer premises. A packet could identify any destination in its header. When packets are processed in a batch, one cannot determine a priori the destination of a packet, as prior to processing a packet its identified destination could be a variety of values.

FIG. 1 is an illustration of an example approach for applying a DOCSIS filter to a packet in accordance with the prior art. As shown in FIG. 1, MAC table 110 identifies, for each MAC destination address shown in column 112, a particular Filter Group ID to use in column 114. Thus, based on a packet's destination, a CMTS may use MAC table 110 to identify which group of DOCSIS filters to use in evaluating the packet. For example, as shown in row 122, if the MAC destination address of a packet is 11:22:33:44:55:20, then Filter Group 3 would be used for this packet. As another example, as shown in row 124, if the MAC destination address of a packet is 11:22:33:44:55:30, then Filter Group 2 would be used for this packet.

When a batch of packets is processed using MAC table 110, instead of proceeding with processing each individual packet in the batch using the appropriate filter group rules to completion in a packet-by-packet fashion, packets may be collected into separate sub-batches for each filter group, and thus gain some parallelism. For example, rather than deciding whether to accept or drop a first packet before considering whether to accept or drop any subsequent packet, some approaches may determine that a group of packets should consult the same set of rules, namely the rules shown in one of table 130, 132, or 134, to determine whether individual packets in that group should be accepted or dropped, and thereafter all the packets in that group may be processed according to the rules in the appropriate table. In this way, a batch of packets having the same Filter Group ID per MAC table 110 can be processed together as a group using the rules in the appropriate filter group table associated with that Filter Group ID.

Each of filter group tables 130, 132, 134 shown in FIG. 1 may have any number of DOCSIS filter group rules. A single rule is typically set forth in each row of a filter group table. Thus, while filter group tables 130, 132, and 134 each possess three rows in the simplified example of FIG. 1, in practice each filter group table will have a large number of rows that more likely than not will differ in number.

FIG. 2 is an illustration of the structure of a DOCSIS filter group rule in accordance with the prior art. FIG. 2 depicts header fields 212, 214, and 216 and payload 218 of packet 210. FIG. 2 also depicts table 230 which comprises rows comprising constituting a rule for processing packets. Each row of table 230 corresponds to a different rule. Column 232 identifies a unique identifier for the rule (i.e., "Rule ID") defined by each row. Column 234 identifies, for the rule defined by each row, criteria to identify certain Ethernet header fields identified by data contained in field 212 for a given packet. Column 236 identifies, for the rule defined by each row, criteria to identify certain IP header fields identified by data contained in field 214 for a given packet. Column 238 identifies, for the rule defined by each row, criteria to identify certain UDP/TCP header fields identified by data contained in field 216 for a given packet.

If a particular rule defined by table 230 matches a packet, then a particular action is taken, as defined by the corresponding field in column 240. For example, if Rule ID 2 matches a packet, then the packet is dropped (i.e., denied transmission); on the other hand, if Rule ID 3 matches a packet, then the packet is accepted (permitted transmission).

Rules are typically applied sequentially in an approach called 'first match.' In a first match approach, the first rule in the table is checked to see if a match is found. Any packets that match Rule 1 are then processed according to Rule 1, and the rest of the unmatched packets are checked against the next rule in the table, namely Rule 2. Any packets that match Rule 2 are then processed according to Rule 2, and the rest of the unmatched packets are checked against the next rule in the table, and so on. Processing proceeds in this fashion until all packets match a rule or the last rule (which typically operates as a default rule) is applied.

When a CMTS performs DOCSIS filter group processing on a batch of packets, the batch of packets is divided into smaller batches depending on its associated filter group. For example, the DOCSIS filter group rules in Filter Group 1 in FIG. 1 may be performed as a first batch, the DOCSIS filter group rules in Filter Group 2 in FIG. 1 may be performed as a second batch, and the DOCSIS filter group rules in Filter Group 1 in FIG. 1 may be performed as a third batch. While the evaluation of the header of a target packet relative to certain criteria specified in the DOCSIS filter group rules comprised within the table of FIG. 2 may be performed using a parallel operation, this evaluation tends to be performed using a smaller batch size, which undesirably decreases the amount of processing efficiency achieved by parallel processing.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for enhanced parallelism in DOCSIS filter group processing are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

DOCSIS Filter Group Processing

Embodiments of the invention may be used by any entity on a computer network that receives packets and applies rules upon those packets to determine what responsive action should be performed upon a received packet, e.g., dropping the packet or forwarding the packet to another recipient across the computer network. Embodiments of the invention enhance the efficiency of performing DOCSIS filter group processing by facilitating the use of multiple filter group ID in a MAC table, which is not performed or supported by prior art approaches. Advantageously, embodiments enable network nodes to realize increased efficiencies in determining an appropriate responsive action in handling bursts of received packets and/or larger batch sizes of received packets.

Embodiments of the invention shall be chiefly described with reference to examples that support the use of multiple filter group ID in a MAC table, however embodiments may be employed with tables that specify packet destinations using approaches other than a MAC address. For example, embodiments of the invention can support the use of multiple filter group ID in a table that identifies packet destinations by IP address, e.g., using IPv4 or IPV6 addresses.

Figure 5:
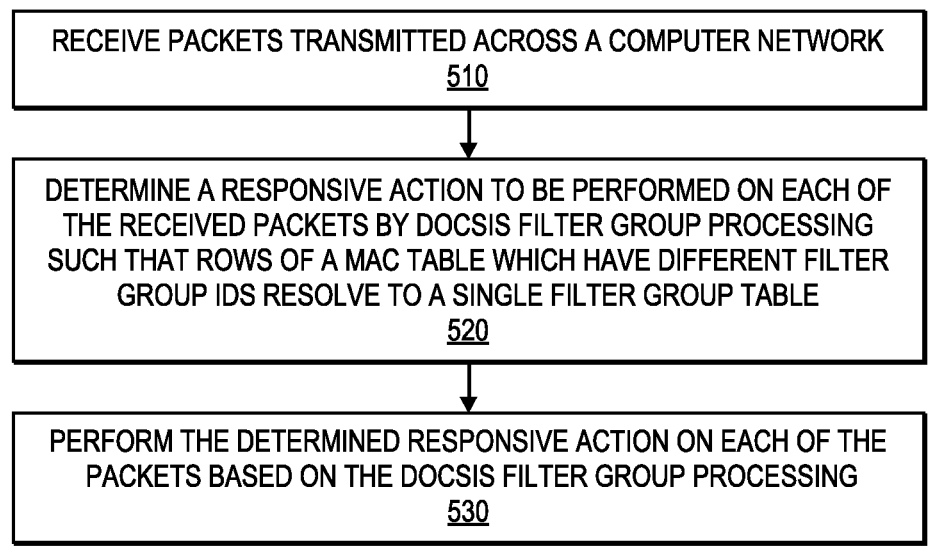
FIG. 5 is a flowchart illustrating the functional steps of performing enhanced parallelism in DOCSIS filter group processing in accordance with an embodiment of the invention.

FIG. 5 is a flowchart illustrating the functional steps of performing enhanced parallelism in DOCSIS filter group processing in accordance with an embodiment of the invention. As shown by FIG. 5, initially in step 510, a plurality of packets that have been transmitted from across a computer network are received by a network entity, such as but not limited to a software or hardware based CCAP, a Remote PHY node, a MACPHY node, a router, a switch, a server. While specific examples have been provided, any network entity capable of receiving packets sent over a computer network may perform step 510.

In step 520, the network entity that received the packets in step 510 then determines a responsive action to be performed on those packets. The responsive action may take a variety of forms, such as a responsive action performed to enforce defined security procedures for the computer network, e.g., packets may be dropped by the recipient of step 510 or permitted to continue traveling across the computer network to the packet's destination. The network entity may do so by performing DOCSIS filter group processing on the plurality of received packets. Thereafter, in step 530, the network entity that determined the responsive action to take for each of the plurality of received packets in step 520 then performs the determined responsive action on each of the plurality of received packets. Advantageously, embodiments provide for performing step 520 such that enhanced parallelism may be realized over prior art approaches, as shall be described in further detail below.

Figure 3:
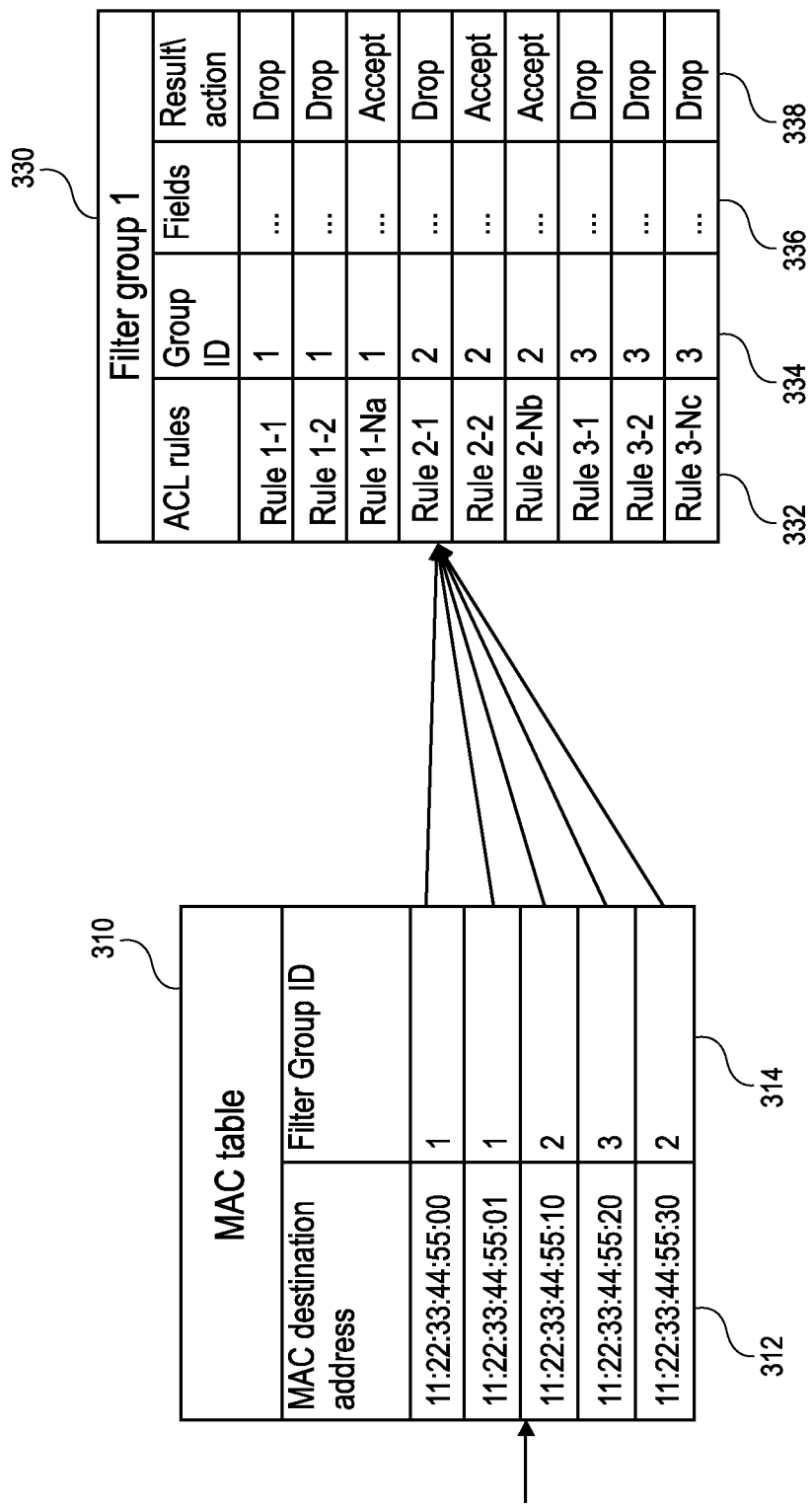
FIG. 3 is an illustration of applying a DOCSIS filter to a packet using a filter group ID according to an embodiment of the invention.

FIG. 3 is an illustration of applying a DOCSIS filter to a packet using a filter group ID according to an embodiment of the invention. FIG. 3 depicts MAC table 310 and a Filter Group table 330. MAC table 310 comprises destination column 312 and Filter Group ID column 314. Destination column 312 stores, for each row, a MAC destination address. Filter Group ID column 314 stores, for each row, a Filter Group ID associated with the corresponding MAC destination address in that row.

As shown in FIG. 3, multiple Filter Group IDs can redirect or resolve to the same Filter Group table, such as Filter Group table 330 in the example of FIG. 3. In an embodiment, Filter Group 330 may be referred to as a single unified Filter Group table 330. Column 332 of Filter Group table 330 stores, for each rule, a name, label, or identifier for the rule. Column 334 of Filter Group table 330 stores, for each rule, criteria, namely a Filter Group ID, which must be satisfied to match to a specified rule defined by a row. Column 336 of Filter Group table 330 corresponds to, for each rule, criteria, besides a Filter Group ID, which must be satisfied to match to a specified rule defined by a row. While column 336 is depicted as a single column, column 336 may be embodied or implemented as multiple columns in embodiments of the invention. Column 338 of Filter Group table 330 stores data identifying, for each rule defined by a row of table 330, a responsive action to perform if that rule is matched by a packet.

Filter Group table 330 of FIG. 3 comprises DOCSIS filter group rules for multiple Filter Group IDs, as evidenced by the different values of multiple Filter Group IDs in column 334. Thus, packets will only match DOCSIS filter group rules associated with the same filter group ID as carried by the packet field.

Advantageously, as DOCSIS filter group rules for multiple filter groups may be performed using a single table, larger batch sizes of packets may be performed in parallel using SIMD instructions. As the batch size of packet will tend to increase using the approach shown in FIG. 3, more efficient AVX-512 parallel processing instructions may be employed.

Figure 2:
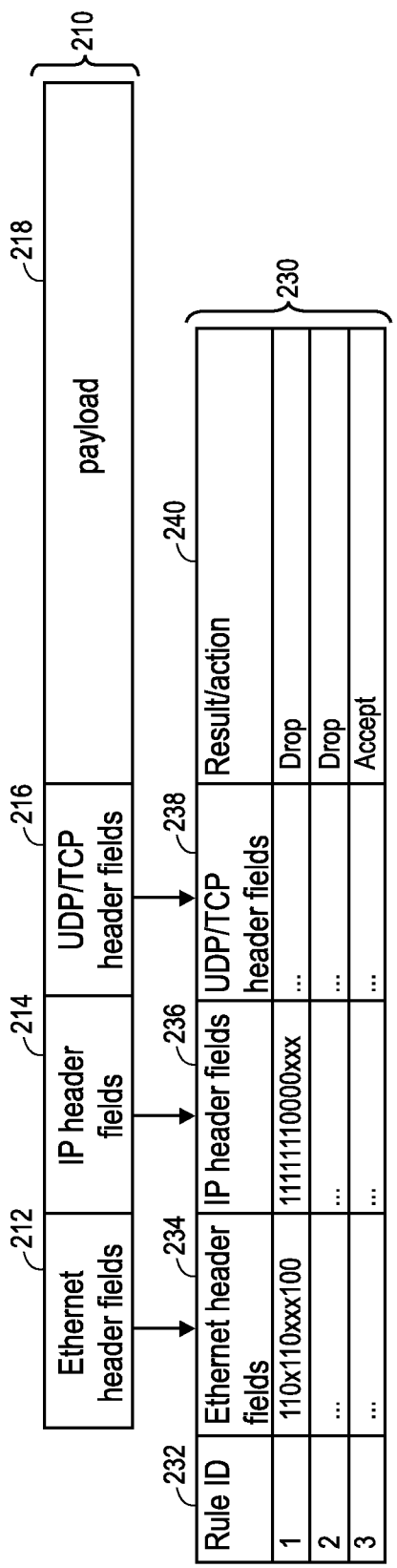
FIG. 2 is an illustration of the structure of a DOCSIS filter group rule in accordance with the prior art.
Figure 4:
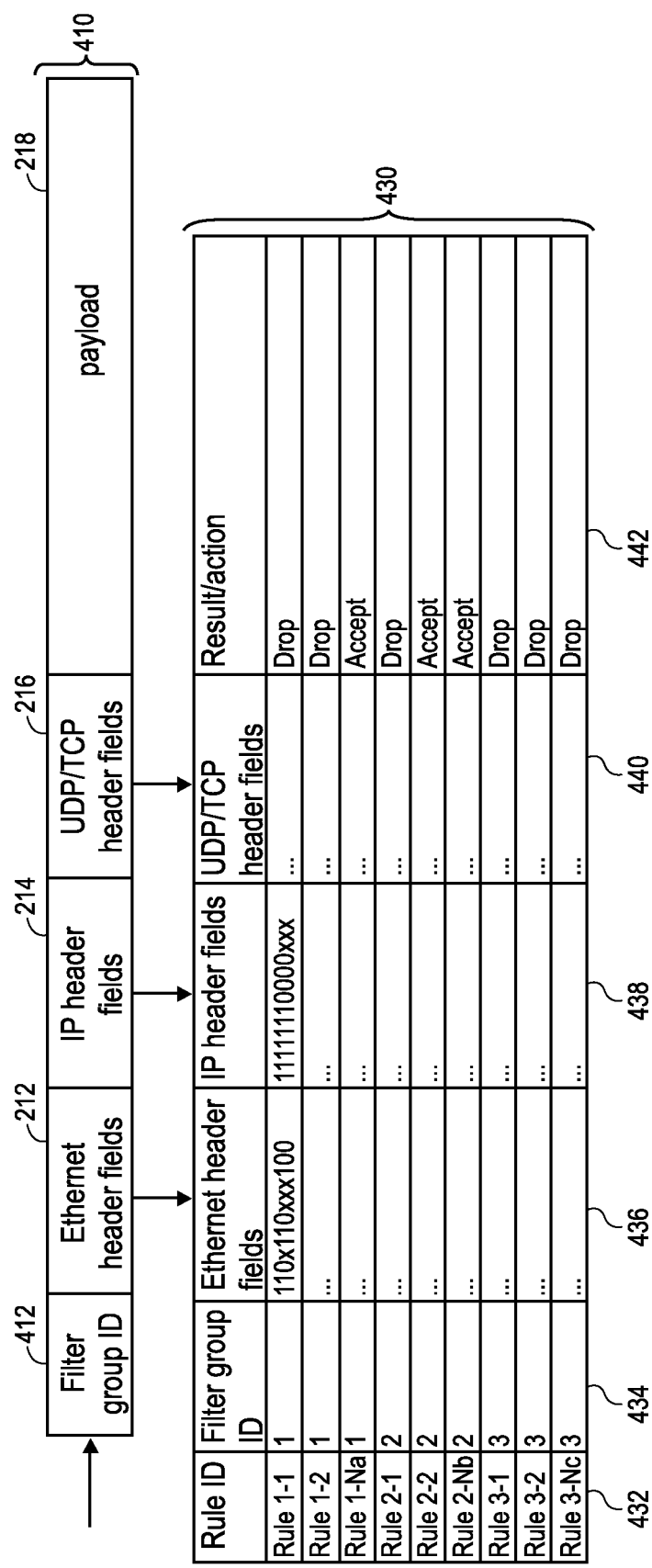
FIG. 4 is an illustration of the structure of a DOCSIS filter group rule in accordance with an embodiment of the invention.

FIG. 4 is an illustration of the structure of a DOCSIS filter group rule in accordance with one embodiment of the invention. FIG. 4 depicts packet 410 having header fields 212, 214, and 216 and payload 218. Unlike packet 210 of the prior art shown in FIG. 2, packet 410 includes an additional field, namely filter group ID 412. In the embodiment depicted in FIG. 4, the filter group ID may be written into the packet buffer as another field of the packet, namely Filter Group ID 412.

The Filter Group ID may be identified by a packet using other approaches than that depicted by FIG. 4. In other words, not all embodiments require a packet comprising the Filter Group ID to be carried within a dedicated field of the packet header, such as Filter Group ID 412 shown in FIG. 4. For example, in another embodiment of the invention (not depicted by FIG. 4), the network entity performing step 520 may copy all the fields of a packet into a new buffer to be temporarily stored. Along with the copied fields stored temporarily in the buffer, an additional field that comprises the Filter Group ID may be included.

As another example of how the Filter Group ID may be identified without relying upon a dedicated field, namely Filter Group ID 412, in the packet header, in another embodiment (not depicted by FIG. 4), an existing field in the packet, such as but not limited to Ethernet header fields 212, IP header fields 214, UDP/TCP header fields 216, and the Type of Service (TOS) field, may be overwritten, at least in part, with the Filter Group ID. If an existing field in the header of a packet is overwritten to store the filter group ID, the field should be overwritten prior to performing DOCSIS filter processing. The original value previously contained in the overwritten field in the header may be restored after the DOCSIS filter processing is performed. In this approach, only a field that is not required for the filtering operation itself can be used.

FIG. 4 also depicts table 430 which comprises rows comprising constituting a rule for processing packets. Each row of table 430 corresponds to a different rule. Column 432 identifies a unique identifier for the rule (i.e., "Rule ID") defined by each row. Column 434 identifies a Filter Group ID for the rule defined by each row. Column 436 identifies, for the rule defined by each row, criteria to identify certain Ethernet header fields identified by data contained in field 212 for a given packet. Column 438 identifies, for the rule defined by each row, criteria to identify certain IP header fields identified by data contained in field 214 for a given packet. Column 440 identifies, for the rule defined by each row, criteria to identify certain UDP\TCP header fields identified by data contained in field 216 for a given packet. Column 442 of Filter Group table 430 stores data identifying, for each rule defined by a row of table 430, a responsive action to perform if that rule is matched by a packet.

As shown in FIG. 4, DOCSIS filter group rules for multiple Filter Group IDs may be stored in a single table, as Filter Group ID column 434 stores Filter Group IDs for a plurality of different Filter Group IDs. As a result, table 430 may be used to process larger batch sizes of packets, which in turn enables more efficient AVX-512 parallel processing instructions to be used.

Figure 1:
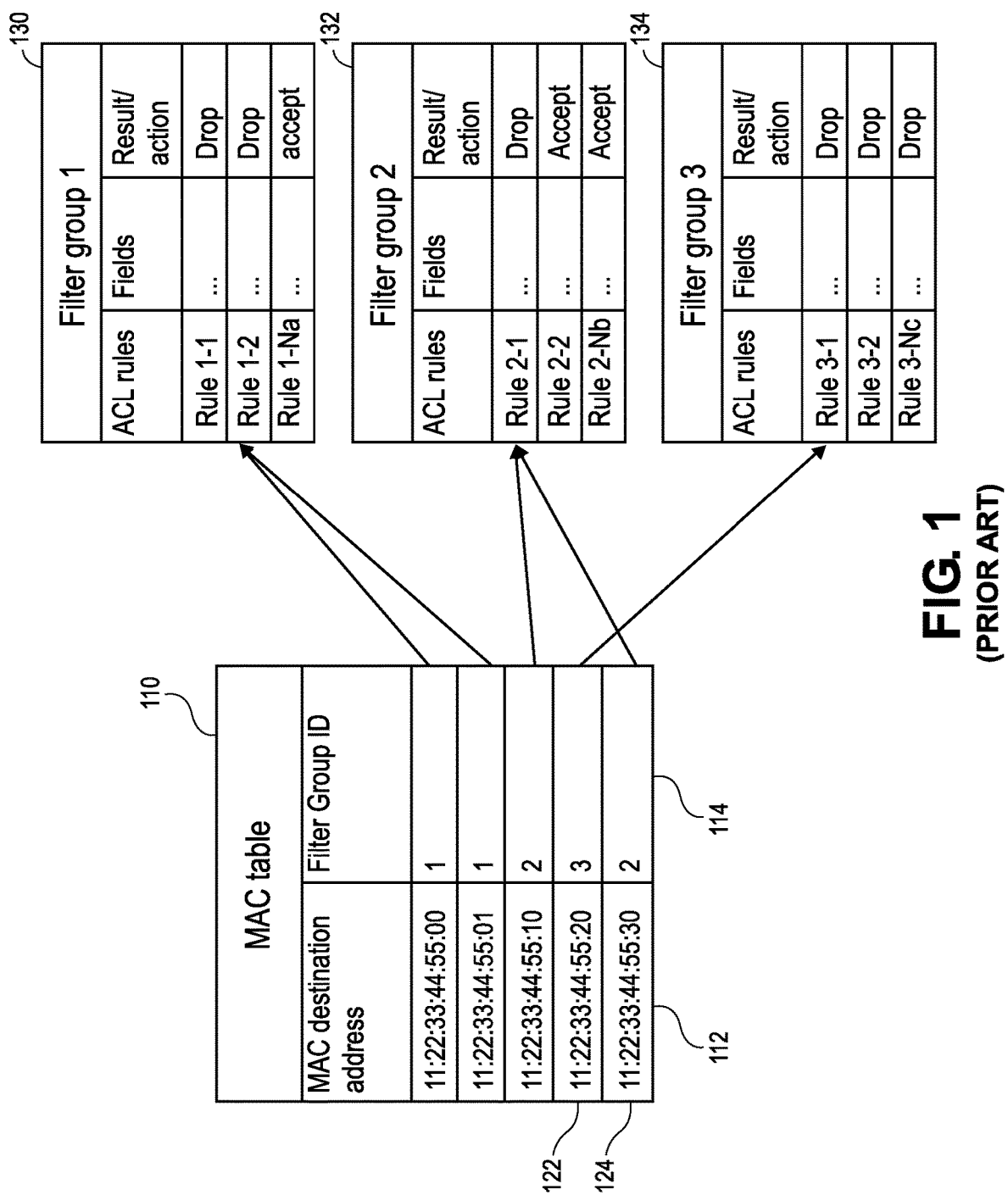
FIG. 1 is an illustration of an example approach for applying a DOCSIS filter to a packet in accordance with the prior art.

Advantageously, embodiments of the invention provide for faster and more efficient processing of DOCSIS filter group rules, thereby allowing physical computer network equipment to process more efficiently and effectively. The prior art approach depicting in FIG. 1 is not capable of achieving the benefits of embodiments, as unifying the filter groups tables 130, 32, and 134 without the addition of the Filter Group ID as part of the filtering operation will produce incorrect results as packets could match rules that belong to the improper Filter Group ID.

Assigning Cable Modem Classifiers

Certain embodiments of the invention may also be used to enhance parallelism when performing downstream (DS) service flow classification. A Cable Modem (CM) classifier is an Access Control List (ACL) that, rather than being used for filtering packets by specifying rules to determine whether to permit or deny a packet, is used to classify into DOCSIS service flows. In other words, a certain packet will be classified into a service flow (which provides a given quality of service (QOS) only if it is matched to a classifier associated with that service flow. One of the service flows for each CM is designated as a "default" service flow so that all packets not matching any other service flow are assigned to the default service flow for that CM.

To support a process of classifying a packet to a CM classifier, an embodiment may employ a single unified classifier table (similar to the single unified Filter Group table discussed above) in memory. When a packet arrives, a determination is made as to which CM the packet is destined using a MAC table lookup or similar approach. Next, information from or associated with the packet is checked against the single unified classification table to determine the service flow for that packet.

The single unified classification table used by embodiments comprises all CM classifiers from all CMs. The single unified classification table may include a field to represent a CM ID (in similar fashion to the filter group ID column 434). In this way, using an embodiment, all CM classifier sets may be flattened into a single large classifier set stored in the single unified classification table. Using the single unified classification table enables all packets to be classified in parallel, thus achieving a higher degree of parallelism than prior art approaches.

To facilitate processing using the single unified classification table, embodiments that support classifying a packet to a particular CM classifier may write the cable modem ID associated with that packet into a field of the packet or in some other location that associates that cable modem ID with that packet. For example, an embodiment may employ a packet that carries its associated cable modem ID within a dedicated field of the packet header. The cable modem ID may also be copied into a buffer to be temporarily stored along with certain information carried by the fields of the packet header. Along with the copied fields stored temporarily in the buffer, an additional field that comprises the cable modem ID may be included to facilitate consultation with the single unified classification table. In another embodiment, an existing field in the packet, such as but not limited to Ethernet header fields 212, IP header fields 214, UDP/TCP header fields 216, and the Type of Service (TOS) field, may be overwritten, at least in part, with the cable modem ID. If an existing field in the header of a packet is overwritten to store the cable modem ID in this fashion, the original value previously contained in the overwritten field in the header may be restored after the packet has been assigned a CM classifier.

The single unified classification table of an embodiment may specify packet destinations using a variety of different approaches, such as a MAC address and an IP address, e.g., using IPv4 or IPv6 addresses.

Implementation

Embodiments may perform each of the steps of FIG. 5 using software. In making a comparison in software, DOCSIS filters are usually implemented by a data structure, such as a tree data structure. A Data Plane Development Kit (DPDK) Access Control List (ACL) library provides capabilities to classify a batch of one or more input packets based on a set of classification rules. Streaming SIMD Extensions (SSE), Advanced Vector Extensions (AVX), AVX2, and AVX-512 are examples of extensions to the x86 instruction set architecture which permit a certain number of packets in a batch to be processed in parallel by allowing the same operation to be performed on multiple memory addresses in the same clock cycle.

The term "non-transitory computer-readable storage medium" as used herein refers to any tangible medium that participates in persistently storing instructions or operational guidance which may be provided to a processor for execution. Additional details about the operation of non-transitory computer-readable storage mediums may be found within U.S. Pat. No. 11,212,590, issued Dec. 28, 2021, entitled "Multiple Core Software Forwarding," the entire contents of which are hereby incorporated by reference for all purposes as if fully set forth herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent modification. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for processing packets in parallel, which when executed, cause:
receiving a plurality of packets transmitted over a computer network;
determining a responsive action to be performed against each of said plurality of packets by performing DOCSIS filter group processing on said plurality of packets using a single unified Filter Group table that comprises a plurality of rules that each define (a) a set of criteria and (b) a particular responsive action to perform against any packet matching the set of criteria for that rule, and wherein said plurality of rules in said single unified Filter Group table identify, in their sets of criteria, different Filter Group identifiers (IDs); and
performing said responsive action on each of said plurality of packets based on said DOCSIS filter group processing.

2. The non-transitory computer-readable storage medium of claim 1, wherein each of the plurality of packets as received each identify an associated Filter Group identifier (ID) in a dedicated field within a header of said each packet.

3. The non-transitory computer-readable storage medium of claim 1, wherein said DOCSIS filter group processing is performed in part by, for each of said plurality of packets, writing, into a buffer, data carried by one or more fields of a packet header of each packet of said plurality of packets along with its corresponding Filter Group ID.

4. The non-transitory computer-readable storage medium of claim 1, wherein said DOCSIS filter group processing in performed in part by, for each packet of said plurality of packets, writing a Filter Group ID to a particular field of a packet header of said each packet.

5. The non-transitory computer-readable storage medium of claim 1, wherein said DOCSIS filter group processing in performed in part by using a MAC table that identifies, for each of a set of MAC addresses, an associated Filter Group identifier (ID).

6. The non-transitory computer-readable storage medium of claim 1, wherein said DOCSIS filter group processing in performed in part by using a destination table that identifies, for each of a set of IP addresses, an associated Filter Group identifier (ID).

7. The non-transitory computer-readable storage medium of claim 1, wherein said performing said responsive action on each of said plurality of packets is performed to enforce defined security procedures for said computer network.

8. An apparatus for processing packets in parallel, comprising:
one or more processors; and
one or more non-transitory computer-readable storage mediums storing one or more sequences of instructions, which when executed, cause:
receiving a plurality of packets transmitted over a computer network;
determining a responsive action to be performed against each of said plurality of packets by performing DOCSIS filter group processing on said plurality of packets using a single unified Filter Group table that comprises a plurality of rules that each define (a) a set of criteria and (b) a particular responsive action to perform against any packet matching the set of criteria for that rule, and wherein said plurality of rules in said single unified Filter Group table identify, in their sets of criteria, different Filter Group identifiers (IDs); and
performing said responsive action on each of said plurality of packets based on said DOCSIS filter group processing.

9. The apparatus of claim 8, wherein each of the plurality of packets as received each identify an associated Filter Group identifier (ID) in a dedicated field within a header of said each packet.

10. The apparatus of claim 8, wherein said DOCSIS filter group processing is performed in part by, for each of said plurality of packets, writing, into a buffer, data carried by one or more fields of a packet header of each packet of said plurality of packets along with its corresponding Filter Group ID.

11. The apparatus of claim 8, wherein said DOCSIS filter group processing in performed in part by, for each packet of said plurality of packets, writing a Filter Group ID to a particular field of a packet header of said each packet.

12. The apparatus of claim 8, wherein said DOCSIS filter group processing in performed in part by using a MAC table that identifies, for each of a set of MAC addresses, an associated Filter Group identifier (ID).

13. The apparatus of claim 8, wherein said DOCSIS filter group processing in performed in part by using a destination table that identifies, for each of a set of IP addresses, an associated Filter Group identifier (ID).

14. The apparatus of claim 8, wherein said performing said responsive action on each of said plurality of packets is performed to enforce defined security procedures for said computer network.

15. A method for processing packets in parallel, comprising:
receiving a plurality of packets transmitted over a computer network;
determining a responsive action to be performed against each of said plurality of packets by performing DOCSIS filter group processing on said plurality of packets using a single unified Filter Group table that comprises a plurality of rules that each define (a) a set of criteria and (b) a particular responsive action to perform against any packet matching the set of criteria for that rule, and wherein said plurality of rules in said single unified Filter Group table identify, in their sets of criteria, different Filter Group identifiers (IDs); and
performing said responsive action on each of said plurality of packets based on said DOCSIS filter group processing.

16. The method of claim 15, wherein each of the plurality of packets as received each identify an associated Filter Group identifier (ID) in a dedicated field within a header of said each packet.

17. The method of claim 15, wherein said DOCSIS filter group processing is performed in part by, for each of said plurality of packets, writing, into a buffer, data carried by one or more fields of a packet header of each packet of said plurality of packets along with its corresponding Filter Group ID.

18. The method of claim 15, wherein said DOCSIS filter group processing in performed in part by, for each packet of said plurality of packets, writing a Filter Group ID to a particular field of a packet header of said each packet.

19. The method of claim 15, wherein said DOCSIS filter group processing in performed in part by using a MAC table that identifies, for each of a set of MAC addresses, an associated Filter Group identifier (ID).

20. The method of claim 15, wherein said DOCSIS filter group processing in performed in part by using a destination table that identifies, for each of a set of IP addresses, an associated Filter Group identifier (ID).

21. The method of claim 15, wherein said performing said responsive action on each of said plurality of packets is performed to enforce defined security procedures for said computer network.

* * * * *